United States Patent
El-Agha et al.

(10) Patent No.: US 7,795,986 B2
(45) Date of Patent: Sep. 14, 2010

(54) MULTI-FORMAT ALL-DIGITAL MODULATOR AND METHOD

(75) Inventors: Alaa El-Agha, Waterloo (CA); Dustin Griesdorf, Waterloo (CA); Gareth P. Weale, New Hamburg (CA); Jakob Nielson, Waterloo (CA)

(73) Assignee: Semiconductor Components Industries, LLC, Phoenix, AZ (US)

( * ) Notice: Subject to any disclaimer, the term of this patent is extended or adjusted under 35 U.S.C. 154(b) by 110 days.

(21) Appl. No.: 12/027,692

(22) Filed: Feb. 7, 2008

(65) Prior Publication Data

US 2009/0096543 A1 Apr. 16, 2009

Related U.S. Application Data

(60) Provisional application No. 60/980,239, filed on Oct. 16, 2007.

(51) Int. Cl.
  H03C 3/00 (2006.01)
  H03K 7/06 (2006.01)
  H04L 27/12 (2006.01)
(52) U.S. Cl. ......................... 332/100; 332/101; 375/303
(58) Field of Classification Search ......... 332/100–102; 375/303–307
See application file for complete search history.

(56) References Cited

U.S. PATENT DOCUMENTS

| | | | |
|---|---|---|---|
| 3,890,581 A | 6/1975 | Stuart et al. | |
| 3,997,855 A | 12/1976 | Nash | |
| 5,712,878 A | 1/1998 | Nemer | |
| 2009/0098834 A1* | 4/2009 | Yoshida et al. | 455/76 |

* cited by examiner

*Primary Examiner*—David Mis
(74) *Attorney, Agent, or Firm*—Pearne & Gordon LLP

(57) ABSTRACT

A method, system and digital modulator for modulation are provided The modulator includes a dividing mechanism for dividing a reference clock by a divide value to produce a modulated signal associated with at least one input data, and a control unit for providing at least one divide sequence to the dividing mechanism. The at least one divide sequence includes a sequence of one or more divide values. The divide value of the divide sequence is configurable and selectively provided to the dividing mechanism based on the at least one input data. The method includes configuring at least one divide sequence including a sequence of one or more divide values, and selecting a divide value from the at least one divide sequence based on at least one input data. The method includes dividing a reference clock by the selected divide value and generating a modulated signal based on the divide operation. The system for modulation-based commutations link includes a modulation unit having a dividing mechanism for dividing a reference clock by a divide value, and a configuration register for one or more configurable divide sequences.

18 Claims, 18 Drawing Sheets

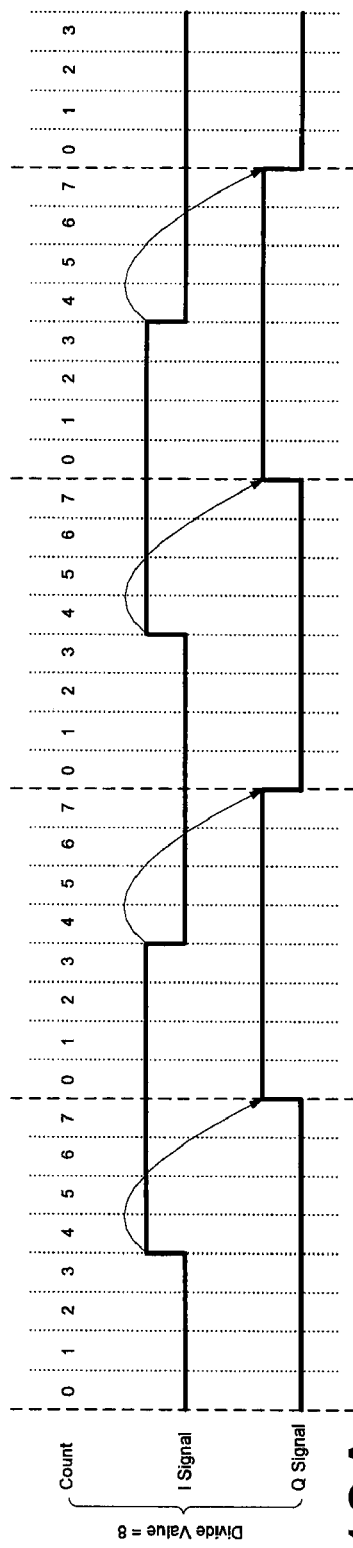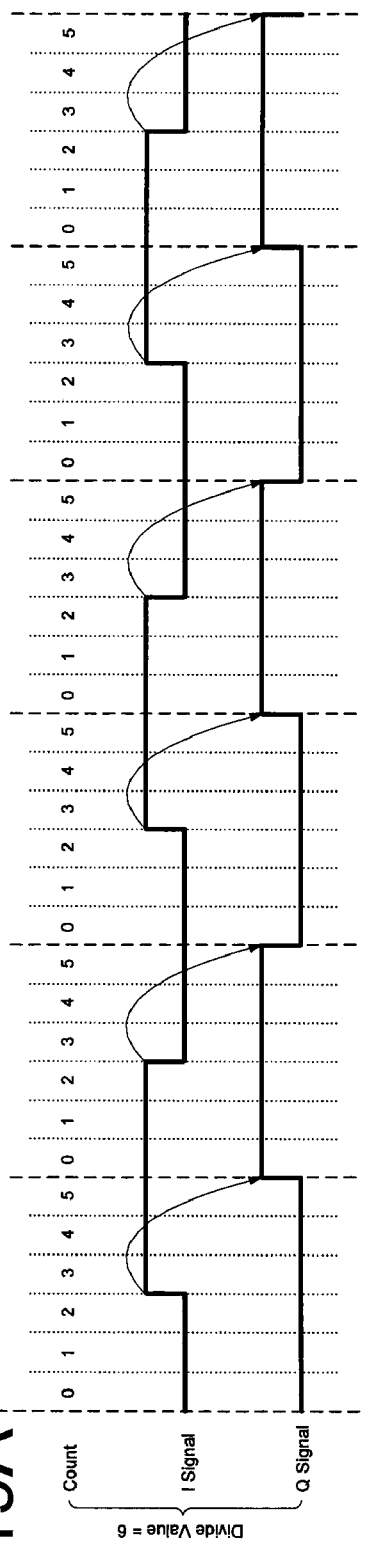

MULTI-FORMAT ALL-DIGITAL MODULATOR AND METHOD

FIELD OF INVENTION

The present invention relates to communication systems, and more specifically to a digital modulating system and method.

BACKGROUND OF THE INVENTION

Digital modulation schemes are becoming the standard method of carrying information in communications systems. They allow for better utilization of frequency spectrum, carry higher data rate information, have better performance and offer easier integration with digital processing systems. Examples of such modulation schemes include M-ary Frequency Shift Keying (MFSK), and Minimum Shift Keying (MSK). When M=2, MFSK is referred to as binary Frequency Shift Keying (FSK). FSK and MSK are well used digital modulation schemes due to their easy implementation. Typically, they are employed for low to medium data rate systems, i.e., 128 kbps.

Implementations of FSK modulators are common and there are various ways to implement an FSK modulator. One way is to use the baseband information bits (to be transmitted) to directly shift the frequency of a Voltage-Controlled-Oscillator (VCO) as shown in FIG. 1. The FSK modulator 10 of FIG. 1 includes a filter 12 for filtering baseband data, and a VCO 14. In the FSK modulator 10, a binary "0" corresponds to a frequency shift above the nominal VCO frequency, while a binary "1" corresponds to a frequency shift below the nominal VCO frequency. To avoid instantaneous change in the VCO frequency, the baseband data is filtered by typically a low pass filter (12 of FIG. 1), i.e., Gaussian filter, to smooth the transitions of the square wave representing the binary baseband data. The FSK modulated signal is then up-converted to a higher frequency for transmission over a wireless link. This implementation has the advantage of being simple, however, suffers from the frequency drift of the free-running VCO.

In another implementation, the VCO is made part of a frequency synthesizer Phase Locked Loop (PLL), as shown in FIG. 2. The FSK modulator 20 of FIG. 2 includes a crystal oscillator 22, Phase/Frequency Detector Change Pump (PFD/CP) 24, a low pass filter 26, a VCO 28 and a dual-modulus divider (N/N+1) 30. The FSK modulator 20 produces a high stability VCO frequency and reduces its frequency drift over time. Further, in this configuration, the PLL is designed so that the VCO nominal frequency is set to the desired transmit frequency of the transmitter. No up-conversion is required. The VCO nominal frequency is synthesized from the crystal oscillator 22 through the PLL. To introduce the FSK modulation, the dual-modulus divider 30 is used in the PLL loop. The baseband data bits of "1"s and "0"s select one of the two divide values of the dual-modulus divider 30. This implementation is referred to as direct VCO modulation. The main advantage of this implementation is the complete elimination of the image problem that is found in all Superhetrodyne and Low-IF transmitter architectures (i.e., that results whenever up-conversion of the modulated signal to a higher frequency is required). However, it imposes major constraints on the PLL loop design and the data rate that can be transmitted. Therefore, it requires significant amount of design efforts to ensure proper operation.

The above methods for generating FSK modulation are of analog nature. An all-digital implementation is advantageous for many reasons. First, it lends itself well for integration with baseband digital processors and requires smaller die area. Another significant advantage is that an all-digital implementation allows early verification of the modulator performance both in a software modeling environment as well as in hardware. For example, during design, the performance in an analog-like implementation (i.e., direct VCO modulation) can only be verified in the analog design and simulation environment. No testing or verification using hardware is possible until the chip is fabricated. However, with an all-digital implementation, it is possible to generate a hardware description for the actual design (i.e., Register Transfer Level: RTL), and test and verify the design on a Field Programmable Gate Array (FPGA) chip. This significantly reduces the risk and provides an early opportunity to capture errors or improve the design before taping out the chip. Such errors or design improvements may only be discovered in an analog-like implementation after the chip is manufactured, requiring another costly tape out.

In its simplest form, an all-digital FSK modulator requires a reference clock and a divider with two divide values. The reference clock is divided by one divide value when the data bit is "1", and is divided by the other divide value when the data bit is "0". The output of the dividing operation is a pulse waveform. Typically, a D flip-flop is used at the output to generate a square wave that is FSK modulated. FIG. 3 illustrates an FSK modulation by using the reference clock. In FIG. 3, "A0" represents the reference clock; "B0" represents a data bit; "C0" represents divide values; "D0" represents the resulting binary FSK modulated square wave. For M-ary FSK modulation, multiple divide values result in an M-ary FSK modulated square waveform. As shown in FIG. 3, an instantaneous frequency change in the resulting FSK modulated signal occurs using this implementation U.S. Pat. No. 5,712,878 (Nemer) discloses a digital FSK modulator that implements the above operation via a state machine. Although higher order FSK modulation is possible, the frequency of the resulting FSK modulated signal is changed almost instantly. This instantaneous frequency change causes higher sidebands in the FSK modulated signal spectrum and results in the FSK modulated signal occupying wider bandwidth. This may be acceptable for some systems. However, when operating a wireless device in most of the frequency bands, regulations require the signal not to occupy more than a specified bandwidth and the sidebands be lower than a specified level.

In U.S. Pat. No. 3,890,581 (Stuart et al.) and U.S. Pat. No. 3,997,855 (Nash), the frequency is changed through a sequence of frequency steps when the data changes from one state to the other. This essentially results in a smoother frequency transition and results in lower spectral sidebands. In U.S. Pat. No. 3,890,581, the intermediate frequency steps are achieved by generating an internal variable duty-cycle sequence that is used to progressively increase or decrease the frequency of the modulated signal. In U.S. Pat. No. 3,997,885, an Up-Down counter is used to produce the intermediate frequency steps.

FIG. 4 illustrates conventional FSK modulation with intermediate frequency steps. As shown in FIG. 4, when the data bit changes, the frequency is stepped up or down starting from the middle of the current bit to the middle of the following bit.

Another desired feature of any modulator is to be able to design a single modulator architecture that is able to operate and produce several modulation schemes with little or no added complexity. This allows one to design a single modulator that can be used in various applications and many frequency bands with little or no effort. However, this should not make such a modulator complex as this translates into higher power consumption. Therefore there is a need to design a modulator that is capable of multi-format modulation, and consumes negligible power compared to a single format modulator.

Very often, modulation is produced at low frequency for easy implementation. This produces a modulated signal centered around a low carrier frequency, often called intermediate frequency or IF. Before transmission, the IF modulated signal must be up-converted to the actual transmission frequency using up-conversion mixers. Such process suffers from a well known problem called image problem. The image problem occurs when a single mixer is used to up-convert the modulated signal. The mixer mixes the modulated (i.e. desired) signal with a local signal (LO signal), coming from a local oscillator. By selecting the proper frequency of the LO signal, the output of the mixer includes the modulated signal at the right transmission frequency. However, by nature of the mixer operation, the up-converted signal will also contain an image of the modulated IF signal. The image is located at a frequency that is distant from the desired carrier frequency. The separation is equal to twice the IF frequency. Hence, in such architectures, a band pass filter is required to filter out the image.

FIG. 5 is a diagram illustrating an IQ front-end transmitter architecture for image rejection. Referring to FIG. 5, a well-known architecture that solves the image problem is the IQ architecture, where the signal is formatted into an In-phase (I) and Quadrature (Q) components (42, 44 and 46). Then each component is mixed with a locally generated LO signal (48, 50) and the output is summed (52). In this architecture, the IQ Generation block 42 takes in the IF modulated signal and generates the I and Q signals. The I signal is simply the IF modulated signal unchanged, while the Q signal is a signal generated by phase shifting the I signal by 90°.

Several techniques are deployed to produce the 90° phase shift. One known technique is to use analog delay cells to generate the 90° phase shift. This technique suffers from requiring a large number of delay cells especially when the IF frequency is low. This results in large die area. Further, since it relies on analog delay cells, it suffers from supply, temperature and process variations. This results in part to part variation in terms of how much image rejection is provided. A better technique that is suited to digital implementations is to generate the IF modulated signal at twice the desired IF frequency and then divide the generated modulated signal (at $2 \times f_{IF}$) by two. The divide by two operation allows one to generate a modulated signal at the IF frequency and another copy that is 90° phase shifted. The advantage of this technique is its simplicity and guaranteed 90° phase shift. The disadvantage is that it requires the modulator to run at double the clock that is required to generate the IF modulated signal. Doubling the frequency of such a clock increases power consumption.

SUMMARY OF THE INVENTION

It is an object of the invention to provide a method and system that obviates or mitigates at least one of the disadvantages of existing systems.

According to an aspect of the present invention there is provided a digital modulator, which includes a dividing mechanism for dividing a reference clock by a divide value to produce a modulated signal associated with at least one input data, and a control unit for providing at least one divide sequence to the dividing mechanism. The at least one divide sequence includes a sequence of one or more divide values. The divide value of the divide sequence is configurable and selectively provided to the dividing mechanism based on the at least one input data.

According to another aspect of the present invention there is provided a method of modulating digital data. The method includes configuring at least one divide sequence including a sequence of one or more divide values, selecting a divide value from the at least one divide sequence based on at least one input data, dividing a reference clock by the selected divide value, and generating a modulated signal based on the divide operation.

According to a further aspect of the present invention there is provided a system for modulation-based commutations link, which includes a modulation unit having a dividing mechanism for dividing a reference clock by a divide value to produce a modulated signal associated with at least one input data, and a configuration register for one or more configurable divide sequences. Each divide sequence includes a sequence of one or more divide values. The divide value of the divide sequence is selectively provided to the dividing mechanism based on the at least one input data.

BRIEF DESCRIPTION OF THE DRAWINGS

These and other features of the invention will become more apparent from the following description in which reference is made to the appended drawings wherein:

FIG. 19A is a diagram illustrating an example of I and Q signal generation by using the divider unit of FIG. 18; and FIG. 19B is a diagram illustrating another example of I and Q signal generation by using the divider unit 200 of FIG. 18.

DETAILED DESCRIPTION

Embodiments of the present invention provide a modulation method, system and modulator that are dynamically configurable to generate modulated signals for multi modulation formats. The modulation method, system and modulator are usable for a plurality of applications, for example, but not limited to, wireless headsets, hearing aids, wireless medical applications, industrial and automotive applications, and applications for any wired and wireless communications link. In the description below, the modulator in accordance with the embodiment of the present invention is referred to as a multi-format all-digital modulator. The multi-format all-digital modulator is programmable and is suitable for ultra low power applications, hence reducing the power consumption.

Figure 6:
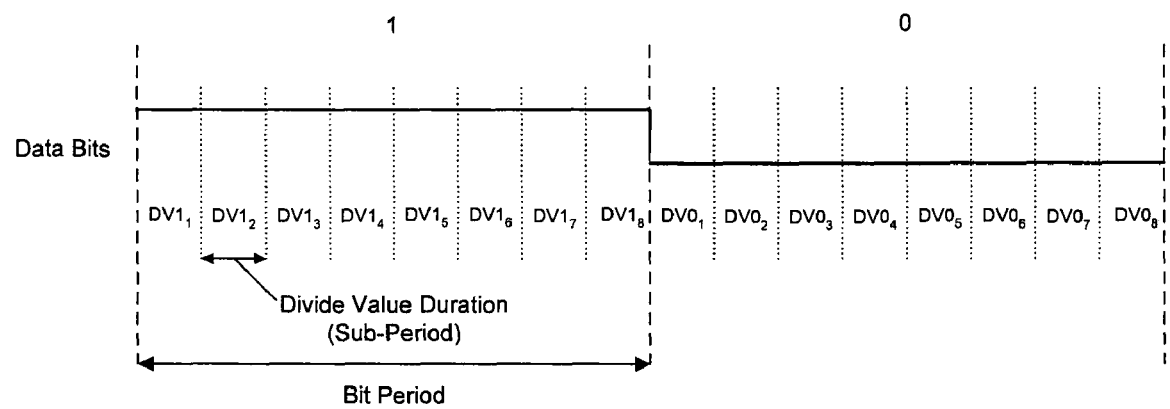
FIG. 6 is a timing diagram illustrating an example of divide sequences in accordance with an embodiment of the present invention.

FIG. 6 is a diagram illustrating an example of divide sequences in accordance with an embodiment of the present invention. As shown in FIG. 6, a data bit period is divided into one or more sub-periods. Each sub-period has a divide value duration (divide value). Each divide value is associated with a frequency for modulation and is configurable. For example, for each data bit or symbol, a divide sequence having the one or more divide values is allocated.

In FIG. 6, each bit period is divided into eight sub-periods. For bit "1", the divide values for each sub-period is denoted by "DV1" and a subscript indicating its number. For bit "0", the divide values are denoted by "DV0" and a subscript indicating its number. In FIG. 6, the sequences of $DV1_1$, $DV1_2, \ldots, DV1_8$ and $DV0_1, DV0_2, \ldots, DV0_8$ form the divide sequences for bits "1" and "0", respectively.

It will be understood by one of ordinary skill in the art that the number of sub-periods for each bit is not limited to eight. The number of sub-periods, and hence the number of divide values (or the length of the divide sequence) may be any integer, and be different for each bit. Each divide value may take any value at any point in time. The sub-periods within a bit may be different. In the description below, it is assumed that the number of sub-periods for one bit is the same as that for the other bit.

As described below, a clock REFCLK is divided by divide values. Based on the division, an FSK modulated signal is generated. For example, the FSK modulated signal has frequency $F_0$ that corresponds to bit "0", and $F_1$ that corresponds to bit "1". When using a divide value $M_0$ for bit "0" and a divide value $M_1$ for bit "1", $F_0$ and $F_1$ are given by the following (1a) and (1b):

$$F_0 = \text{REFCLK}/(2 \times M_0) \quad (1a)$$

$$F_1 = \text{REFCLK}/(2 \times M_1) \quad (1b)$$

In one example, all the divide values are set to the same value for bit "0" (i.e., $DV0_1 = DV0_2 = \ldots = DV0_8 = M_0$), and all divide values for bit "1" are set to the same value (i.e., $DV1_1 = DV1_2 = \ldots = DV1_8 = M_1$). In this example, an FSK modulated signal is produced with no intermediate frequency steps.

Figure 1:
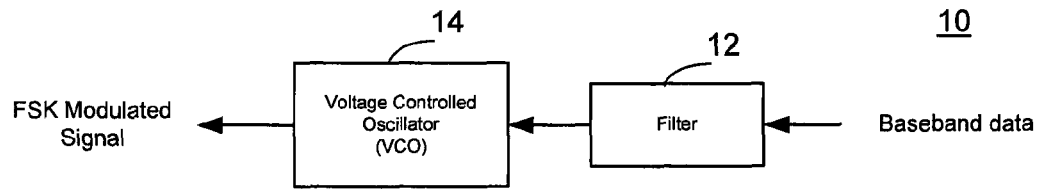
FIG. 1 is a block diagram illustrating a conventional analog FSK modulator.
Figure 2:
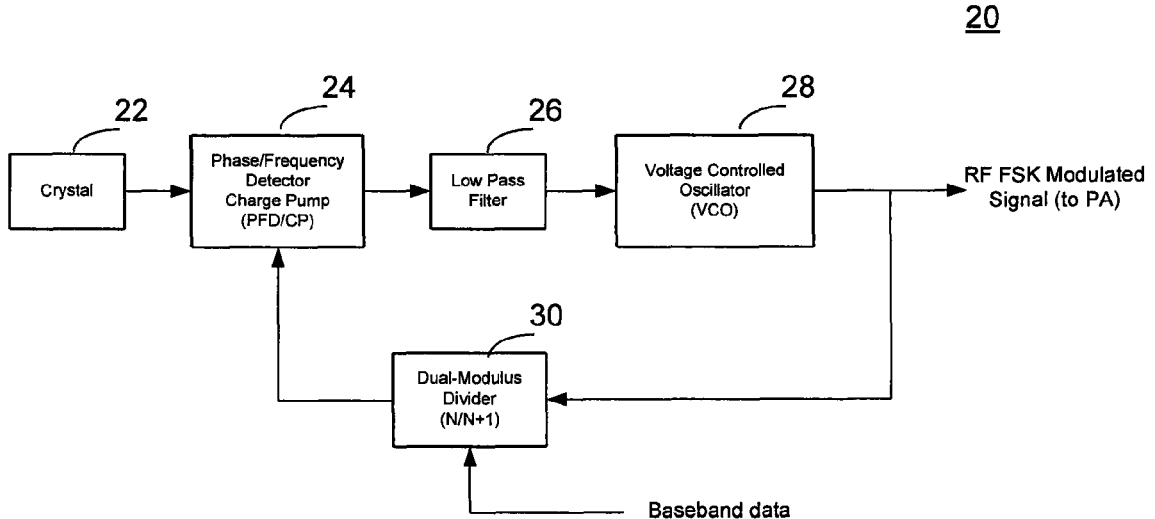
FIG. 2 is a block diagram illustrating another conventional analog FSK modulator.
Figure 3:
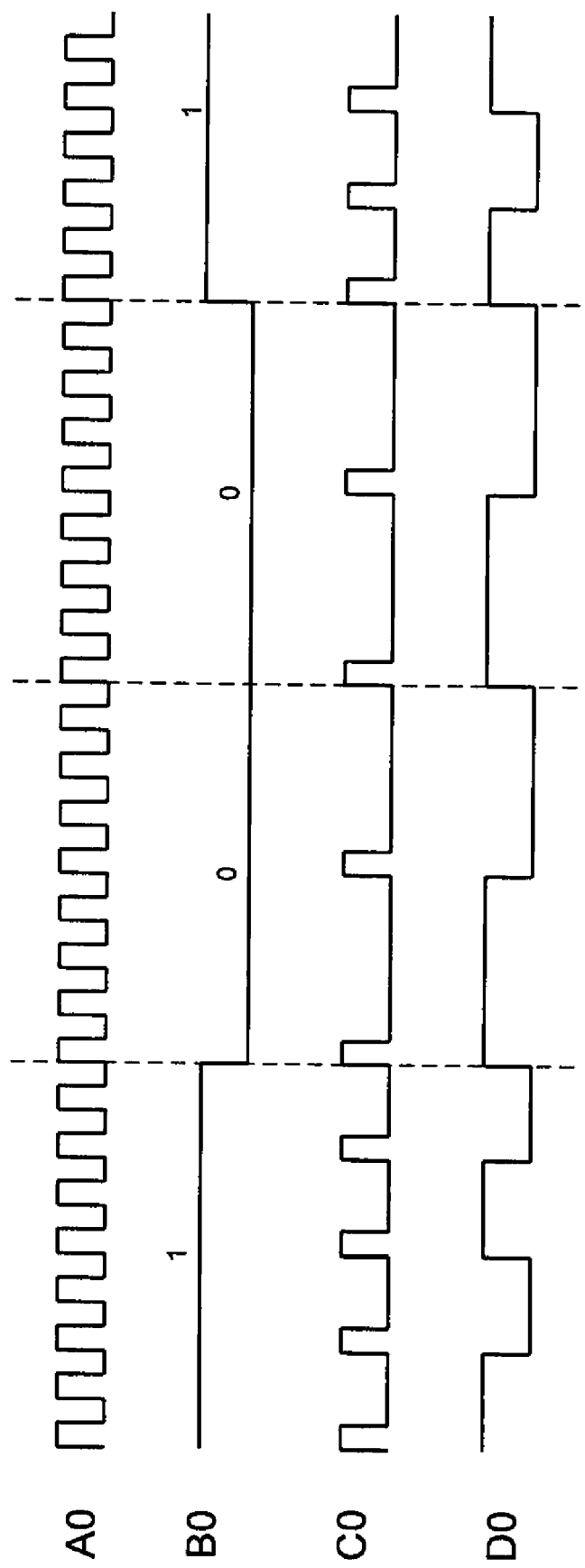
FIG. 3 is a timing diagram illustrating conventional FSK modulation by using a reference clock.
Figure 4:
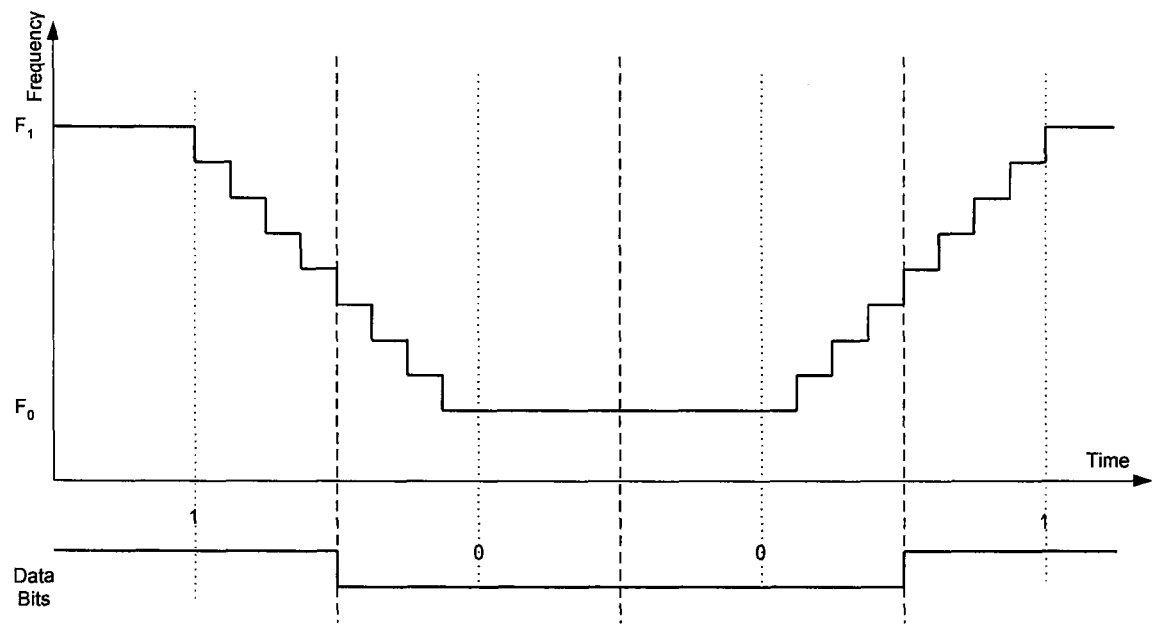
FIG. 4 is a timing diagram illustrating an example of a conventional all-digital FSK modulated signal with intermediate frequency steps.
Figure 5:
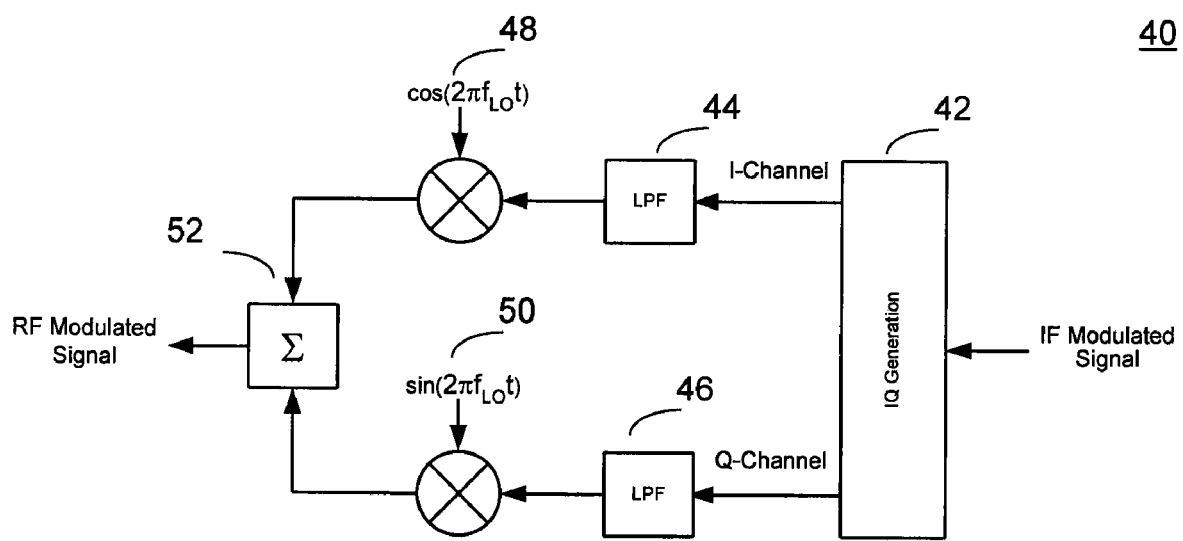
FIG. 5 is a diagram illustrating a conventional IQ front-end transmitter architecture for image rejection.

In another example, the divide values are progressively changed from one sub-period to the next by setting the appropriate $DV1_1, DV1_2, \ldots, DV1_8$ and $DV0_1, DV0_2, \ldots, DV0_8$ sequences, which introduces intermediate frequency steps as the data bits change state. Intermediate frequency steps are introduced by changing the divide values as the data bit changes state. For example, when the data bit changes from "0" to "1", the divide value may be changed from $M_0$ to $M_1$, in any number of steps. There is no restriction as to have to start the intermediate frequency steps at the middle of the current bit and end at the middle of the following bit (FIG. 4) since the divide sequences $DV1_1, DV1_2, \ldots, DV1_8$ and $DV0_1, DV0_2, \ldots, DV0_8$ can be assigned to any values. Thus, the intermediate frequency steps can start at any point of the current bit and end at any point of the next bit. This allows better spectrum shaping of the produced FSK modulated signal, and better control of the shape and level of the spectrum sidebands. This allows more flexible and freedom to shape the spectrum of the modulated signal in order to reduce the occupied bandwidth and reduce spurious emissions of the modulated signal.

Figure 7:
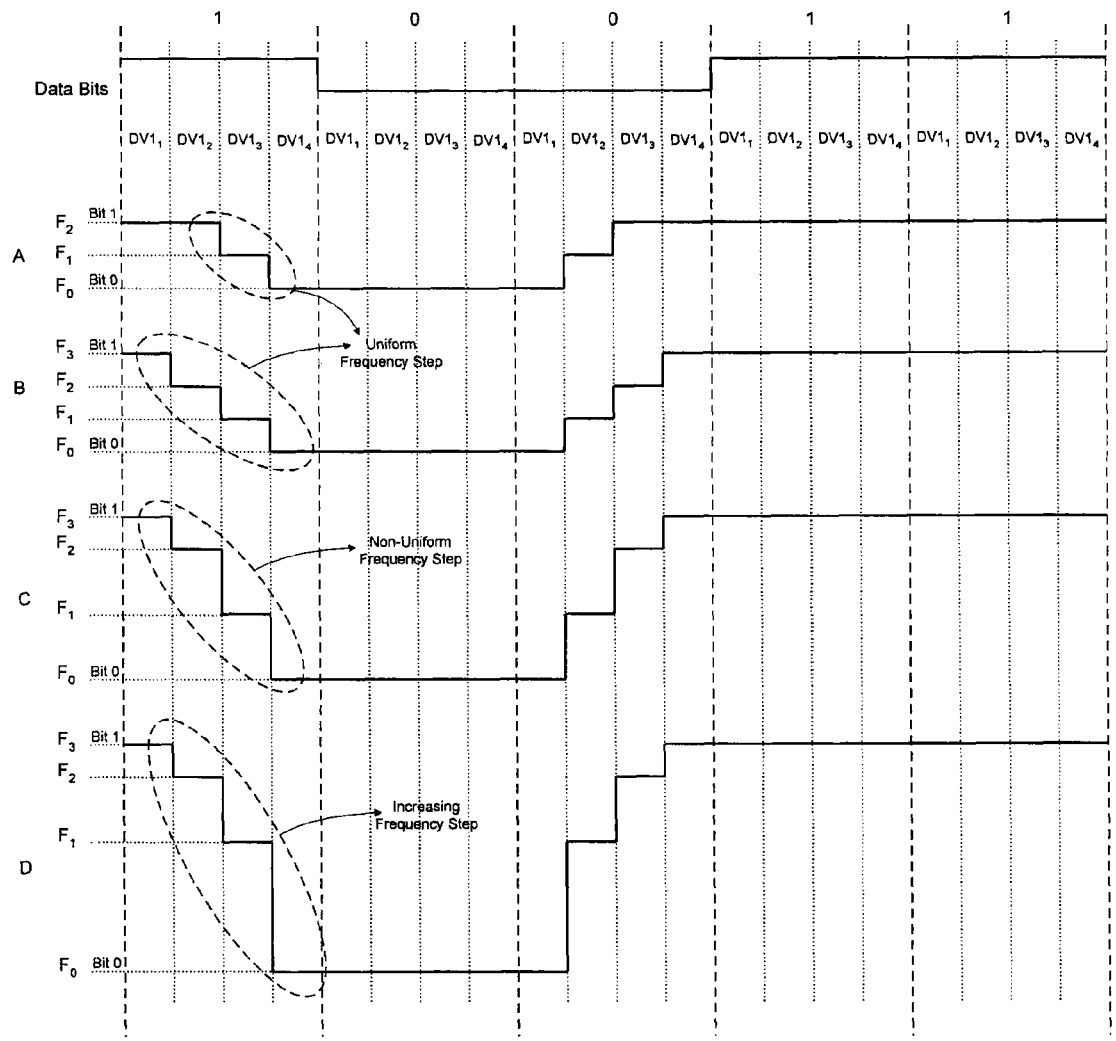
FIG. 7 is a timing diagram illustrating an example of modulation of a data bit with intermediate frequency steps in accordance with an embodiment of the present invention.

FIG. 7 is a diagram illustrating an example of a method for modulating a data bit with intermediate frequency steps using four sub-periods (i.e., divide values) per bit, in accordance with an embodiment of the present invention. In FIG. 7, "Fi" (i=0, 1, 2, . . . ) represents the ith frequency for modulating a FSK modulated signal. The width between "Fi" and "Fi+1" represents a difference between the ith frequency Fi and the (i+1)th frequency Fi+1. In each of "A", "B", "C", and "D", a set of frequencies is shown for the FSK modulation.

Among many divide sequence possibilities, in FIG. 7 four types of intermediate frequency steps are shown as the FSK modulated signal frequency changes from a frequency corresponding to bit "1" (Fn, where n is the highest index on the vertical axis for each waveform), to a frequency corresponding to bit "0" (i.e., $F_0$ for waveforms A-D).

In waveforms A and B, the divide values are chosen to produce a uniform frequency step (i.e., $F_{i+2} - F_{i+1} = F_{i+1} - F_i$), while in waveform C, they produce non-uniform frequency steps (e.g., $F_3 \neq F_2$). In waveform D, the frequency step is progressively increased (i.e., $F_i < F_{i+1}$) as the FSK modulated signal frequency moves from bit "1" frequency (i.e., $F_3$) to bit "0" frequency (i.e., $F_0$). The examples A-D in FIG. 7 demonstrate the versatility and flexibility of the multi-format all-digital modulation method.

Figure 8:
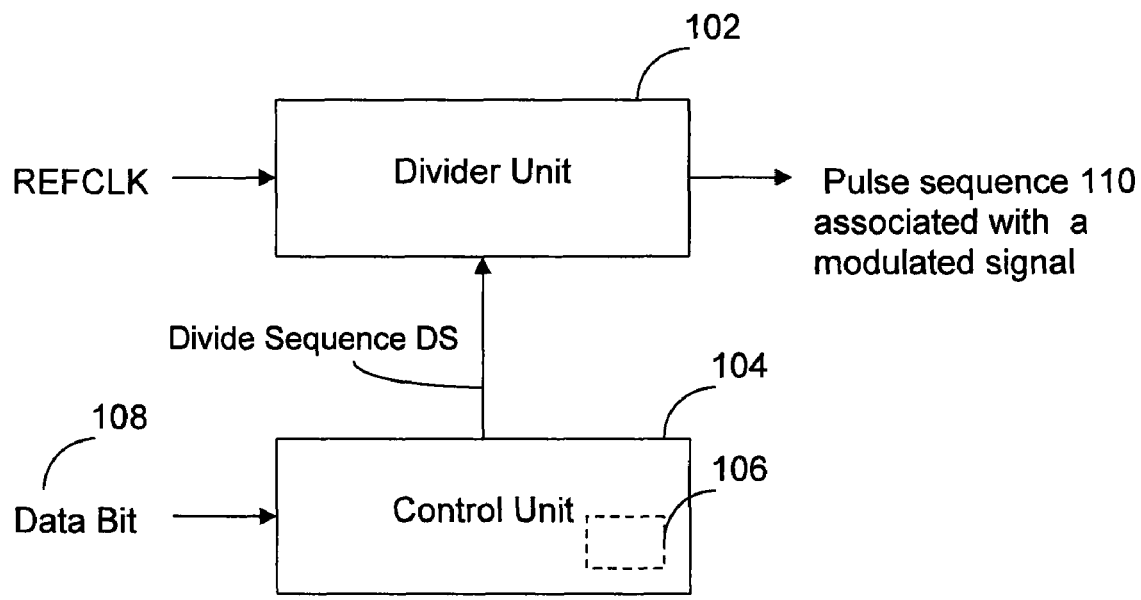
FIG. 8 is a block diagram illustrating an example of a multi-format all-digital modulator in accordance with an embodiment of the present invention.

FIG. 8 is a block diagram illustrating an example of a multi-format all-digital modulator in accordance with an embodiment of the present invention. The multi-format all-digital modulator 100 of FIG. 8 is an all digital modulator and is configurable for multi-modulation schemes.

The multi-format all-digital modulator 100 includes a divider unit 102 for dividing a reference clock REFCLK and outputs a pulse sequence 110 associated with a modulated signal, and a control unit 104 for controlling the operation of the divider unit 102. The control unit 104 provides a divide value to the divider unit 102. The divider unit 102 may include a register for receiving the divide value from the control unit 104 (e.g., 124 of FIG. 9). The REFCLK may be part of the multi-format all-digital modulator 100 or supplied by another part of the system. The divide value is configurable at any time of operation, and a modulation format for the modulation signal is changeable on the fly. The modulation format may be associated to, for example, but not limited, binary FSK modulation, M-ary FSK modulation, or MSK modulation. The modulation format may be associated to, for example, but not limited, Phase Shift Keying (PSK) modulation and may be related to I and Q signals.

The multi-format all-digital modulator 100 uses one or more divide sequences DS. For example, a divide sequence having P divide values (e.g., $DV1_1, DV1_2, \ldots, DV1_P$ of FIG. 6) and a divide sequence having Q divide values (e.g., $DV0_1, DV0_2, \ldots, DV0_Q$ of FIG. 6) may be used. The divide sequence is selected based on at least one input data bit 108, and an associated divide value is loaded/provided to the divider unit 102 by the control unit 104. In the description below, the terms "data bit(s) 108" and "data bit line 108" may be used interchangeably.

The divide sequences may be stored in a storage (e.g., configurable register). The storage for the divide sequences may be a volatile or non-volatile storage. The divide sequences are updatable. The divide sequences may be pre-determined or programmed by a user. In one example, the control unit 102 may contain the storage for storing the divide sequences. In another example, the storage for the divide sequences may be outside the control unit 104. In a further example, the storage for the divide sequences may be outside the multi-format all-digital modulator 100, and may be in a wireless device.

The divide sequences may be produced by using one template (one divide sequence). For example, at least one divide sequence is calculated based on the template.

The multi-format all-digital modulator 100 may include a plurality of modes for the divide operation, and include a mode control block 106 for mode control associated with the modes. The mode control block 106 may include a mechanism for allowing the divider unit 102 to complete the current divide operation when the data bit changes during the current divide operation. The operation block 106 may include a mechanism for forcing the divider unit 102 to interrupt the current divide operation when the data bit changes during the current divide operation. In one example, the mode control block 106 is included in the control unit 104, as shown in FIG. 8. However, the divide operation control block 106 may be outside the control unit 104.

In a further embodiment, the multi-format all-digital modulator 100 includes a mechanism to detect the current bit and two divide sequences $DV1_1, DV1_2, \ldots, DV1_P$ (corresponding to bit "1") and $DV0_1, DV0_2, \ldots, DV0_Q$ (corresponding to bit "0") where P and Q can be any integer, and receives a REFCLK. Each divide sequence includes P or Q divide values. Each divide value may be of any size appropriate for the implementation.

In a further embodiment, the multi-format all-digital modulator 100 has a mechanism that detects what the next bit is. The divide value that produces the frequency corresponding to bit "1" and the divide value that produces the frequency corresponding to bit "0" are stored in DV1 and DV0 in the modulator. If the next bit is the same as the current bit, the modulator continues to use the current divide value, either DV1 (if the current bit is "1") or DV0 (if the current bit is "0"). If the next bit is different, then the modulator uses the divide values stored in the divide sequences $DV1_1, DV1_2, \ldots, DV0_P$ and $DV0_1, DV0_2, \ldots, DV0_P$. In this case, $DV1_1, DV1_2, \ldots, DV1_P$ and $DV0_1, DV0_2, \ldots, DV0_P$ may store the divide values for the intermediate frequencies only.

Figure 9:
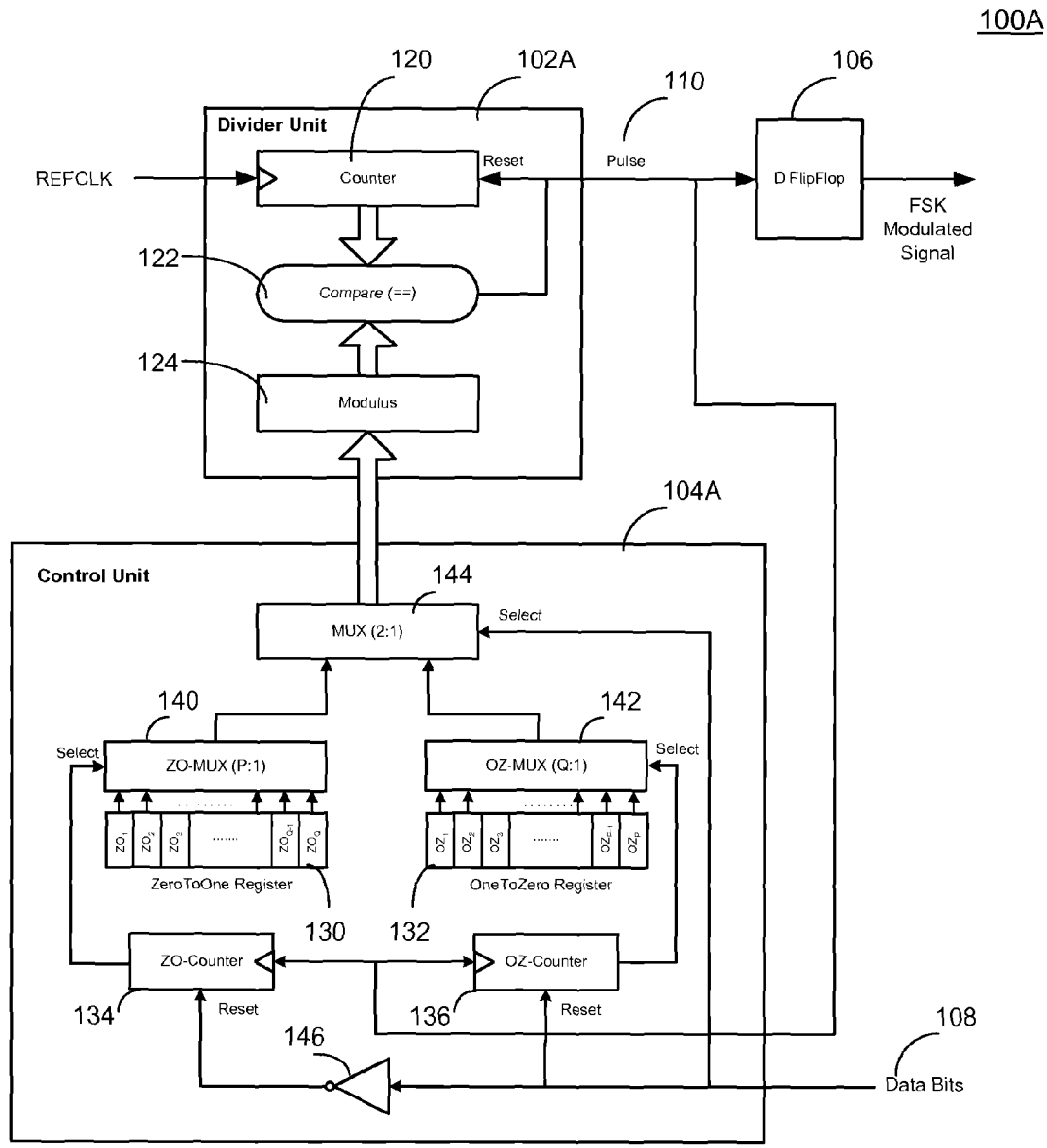
FIG. 9 is a diagram illustrating an example of the multi-format all-digital modulator of FIG. 8.

FIG. 9 is a diagram illustrating an example of the multi-format all-digital modulator 100 of FIG. 8. The multi-format all-digital modulator 100A of FIG. 9 produces a binary FSK modulated signal having intermediate frequency steps. The multi-format all-digital modulator 100A includes a divider unit 102A, a control unit 104A, and a D flip flop (DFF) 106. The divider unit 102A corresponds to the divider unit 102 of FIG. 8. The control unit 104A corresponds to the control unit 104 of FIG. 8.

The divider unit 102A receives a reference clock REFCLK and outputs a pulse (Pulse) 110. The Pulse waveform 110 is input to the DFF 106 that acts as a toggle. The DFF 106 outputs a binary FSK modulated signal. The control unit 104A has an input connected to the data bit 108 and controls the operation of the divider unit 102A. The control unite 104A contains two divide sequences, one having Q divide values and the other having one having P divide values (P and Q can be any integer). The control unit 104A detects a data bit and selectively provides to the divider unit 102A a divide value depending on the data bit.

The divider unit 102A includes a counter 120, a compare logic unit 122, and a modulus register 124. The modulus register 124 stores the current divide value. The counter 120 is clocked by the REFCLK. Whenever the counter value equals to the current divide value stored in the modulus register 124, the compare logic unit 122 produces the Pulse 110. This Pulse 110 is used internally by the divider unit 102A to reset the counter 120. In the description below, "divide cycle" represents the time duration during which the compare logic unit 122 compares the value in the counter 120 to the divide value stored in the modulus register 124.

The control unit 104A includes two storage registers (ZeroToOne register 130 and OneToZero register 132), two counters (ZO-counter 134 and OZ-counter 136), three MUX's (ZO-MUX 140, OZ-MUX 142 and MUX 144), and an inverter 146. The registers 130 and 132 are dynamically configurable.

The ZeroToOne register 130 stores a divide sequence having Q divide values (where Q can be any integer). The divide sequence stored in the ZeroToOne register 130 produces the intermediate frequencies as the bit changes from bit "0" to bit "1". In one example, at least the first divide value stored in the ZeroToOne register 130 is set to the divide value that produces the frequency which corresponds to bit "0", and at least the last divide value is set to the divide value that produces the frequency which corresponds to bit "1". In FIG. 9, "$ZO_j$", (j=1, \ldots, Q) represents the jth divide value stored in ZeroToOne register 130.

The OneToZero register 132 stores a divide sequence having P divide values (where P can be any integer). The divide sequence stored in the OneToZero register 132 produces the intermediate frequencies as the bit changes from bit "1" to bit "0". In one example, at least the first divide value stored in the OneToZero register 132 is set to the divide value that produces the frequency which corresponds to bit "1", and at least the last divide value is set to the divide value that produces the frequency which corresponds to bit "0". In FIG. 9, "$OZ_k$", (k=1, \ldots, P) represents the kth divide value stored in OneToZero register 132.

For example, it is assumed that "30" is the divide value that produces the frequency corresponding to bit "0"; "26" is the divide value that produces the frequency corresponding to bit "1"; P=Q=8. Then, the ZeroToOne register 130 may contain, for example, but not limited to, the sequence 30 29 28 27 26 26 26 26 where $ZO_1$ is 30 and $ZO_8$ is 26, and the OneToZero register 132 may contain, for example, but not limited to, the sequence 26 27 28 29 30 30 30 30 where $OZ_1$ is 26 and $OZ_8$ is 30.

The divide values in the ZeroToOne register 130 are MUX'ed by the ZO-MUX 140. The divide value that the ZO-MUX 140 selects is determined by the current value of the ZO-counter 134. In a similar manner, the divide values in the OneToZero register 132 are MUX'ed by the OZ-MUX 142. The divide value that the OZ-MUX 142 selects is determined by the current value of the OZ-counter 136. The maximum value that the ZO-counter 134 can count up to is, for example but not limited to, "Q". The maximum value that the OZ-counter 136 can count up to is, for example but not limited to, "P".

The ZO-counter 134 and OZ-counter 136 operate in response to the Pulse 110. The ZO-counter 134 is reset by the data bit 108. The OZ-counter 136 is reset by the data bit 108 via the inverter 146. When the ZO-counter 134 and OZ-counter 136 reach their maximum count, they do not rollover but rather stay at their final values (i.e., maximum count for each), until they are explicitly reset by the data bit 108. At any point in time, either the ZO-counter 134 or OZ-counter 136 will be held in reset state.

The ZO-MUX 140 and OZ-MUX 142 are clocked by the Pulse 110 from the divider unit 102A. The outputs of the ZO-MUX 140 and OZ-MUX 142 are MUX'ed by the 2:1 MUX 144 in order to load the next divide value into the modulus register 124. The MUX 144 selects the data path from the ZO-counter 134 or the OZ-counter 136 based on the data bit 108.

If the next bit is the same as the current bit, the modulator 100A continues to use the current divide value. If the next bit is different, the modulator uses the divide values stored in the divide sequences corresponding to OZi and ZOj (i=1, ..., P, j=1, ..., Q).

Figure 10:
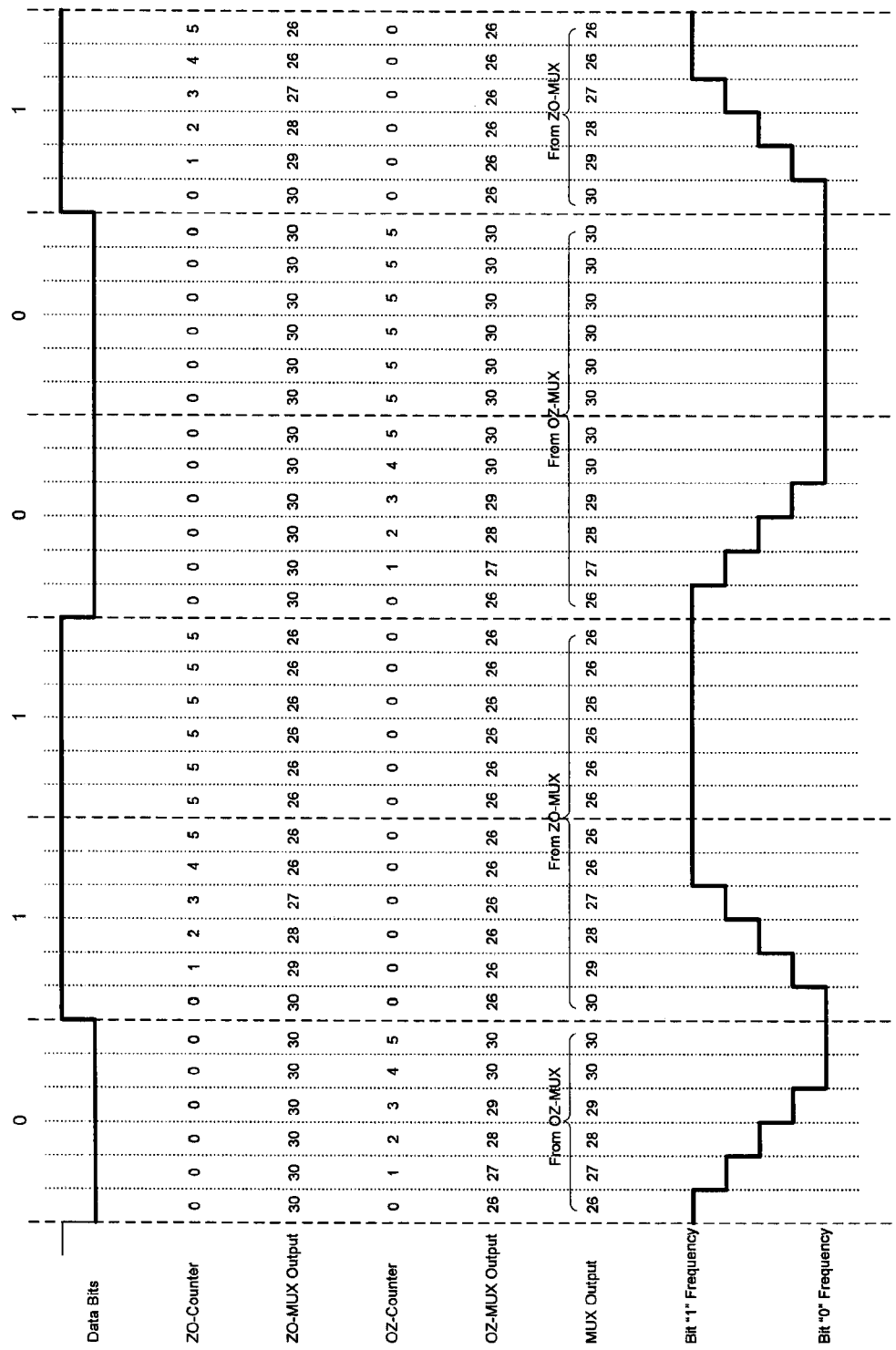
FIG. 10 is a timing diagram illustrating an example of modulation operation by the multi-form all-digital modulator of FIG. 9.

FIG. 10 is a diagram illustrating an example of modulation operation by the multi-form all digital modulator 100A of FIG. 9. In FIG. 10, P=Q=6 (sub-periods in a bit); the Zero-ToOne register 130 of FIG. 9 is set to 30 29 28 27 26 26; the OneToZero register 132 of FIG. 9 is set to 26 27 28 29 30 30. Referring to FIGS. 9 and 10, the MUX 144 selects the data path coming from the OZ-counter 136 if the bit is "0", while it selects the data path coming from the ZO-counter 134 if the data bit is "1". The first bit in this example is "0". It is assumed that a bit prior to the first bit "0" is "1". Since the bit changes from "1" to "0", the ZO-counter 134 is held reset while the OZ-counter 136 is active. The first divide value of 26 (=$OZ_1$) is loaded into the modulus register 124.

When the first Pulse (e.g., 110 of FIG. 9) is generated by the compare logic unit 122, the OZ-counter 136 increments, and the next divide value of 27 (=$OZ_2$) is loaded, and the process continues. When the data bit changes to "1" (second bit), the OZ-counter 136 is reset, and the ZO-counter 134 is active. The MUX 144 selects the first divide value from the Zero-ToOne register 130, which is 30 (=$ZO_2$), and the process continues as described above.

With the next data bit is still "1" (no data change occurred in this example), the ZO-counter 134 is still active while the OZ-counter 136 is still reset. At this point, the ZO-counter 134 has reached to its maximum value, "5". Thus, the divide value loaded into the modulus divider 124 is 26 for the duration of this data bit "1". The process then repeats for the following bits. "MUX Output" in FIG. 10 shows the outputs of the 2:1 MUX 144, which are the divide values loaded into the modulus register 124 over time. The line in the bottom of FIG. 10 shows the resulting frequency of the binary FSK modulated signal.

Figure 11:
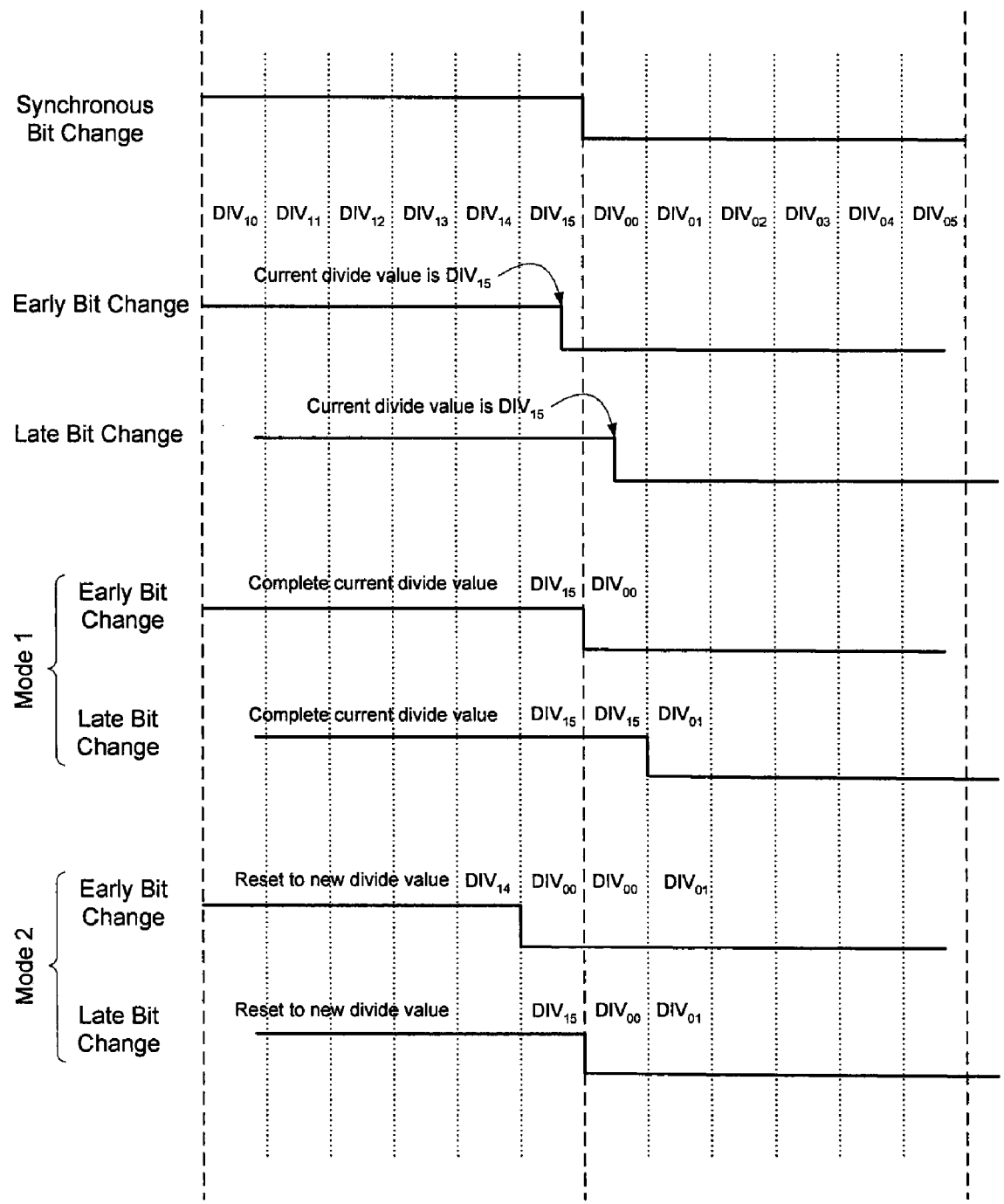
FIG. 11 is a timing diagram illustrating an example of mode control and divide values in accordance with an embodiment of the present invention.

The data bit stream may be synchronous to the rest of the multi-format all-digital modulator 100A of FIG. 9 (e.g., "Synchronous Bit Change" of FIG. 11). In some cases, the data bit stream may be asynchronous to the rest of the multi-format all-digital modulator 100A. For example, the data bit may change state early or late (e.g., Early Bit Change and Late Bit Change in FIG. 11) with reference to the case when the bit changes are synchronous to the multi-format all-digital modulator 100A.

In a further embodiment, the multi-format all-digital modulator 100A of FIG. 9 has a plurality of modes of operation and associated mode control. FIG. 11 is a diagram illustrating an example of mode control and associated divide values in accordance with an embodiment of the present invention. In FIG. 11, Mode 1 and Mode 2 are shown as an example of modes employed in the modulator 100A of FIG. 9. In FIG. 11, for bit "1", the divide values for each sub-period is denoted by "$DIV_1$" and a subscript indicating its number; for bit "0", the divide values are denoted by "$DIV_0$" and a subscript indicating its number.

"Synchronous Bit Change" shows that the change of the data bit from "1" to "0" is synchronous to the change of the divide value from $DIV_{15}$ to $DIV_{00}$.

"Early Bit Change" shows that the data bit changes state before the counter 120 reaches the divide value ($DIV_{15}$) stored in the modulus register 124. In "Early Bit Change", the divider unit 102A of FIG. 9 has not completed the divide operation for $DIV_{15}$ when the data bit changes "Late Bit Change" shows that the data bit changes state after the counter 120 reaches the divide value ($DIV_{15}$) stored in the modulus register 124. In "Late Bit Change", the current divide value is still $DIV_{15}$ after the counter 120 of FIG. 9 completes the divide operation for $DIV_{15}$.

Referring to FIGS. 9 and 11, in Mode 1, the multi-format all-digital modulator 100A is allowed to complete the current divide cycle before switching to the first divide value for the new bit, although the data bit state has already changed. Thus, the effect of the changed data bit state is delayed until the current divide cycle is completed. For example, when "Early Bit Change" occurs in Mode 1 (i.e., the bit changes state during $DIV_{15}$), the current divide value $DIV_{15}$ stored in the modulus register 124 is still used and the new divide $DIV_{00}$ value is only loaded into the modulus register 124 when the counter 120 reaches $DIV_{15}$. At this point, the Pulse 110 is generated and $DIV_{00}$ is loaded into modulus 124. The net effect is that using the new divide value $DIV_{00}$ is deferred until the current divide cycle is completed. However, when "Late Bit Change" occurs in Mode 1 (i.e., the bit changes state during $DIV_{00}$), the current divide value $DIV_{15}$ stored in the modulus register 124 is still used and Pulse 110 generation is deferred until the current divide cycle (dividing by $DIV_{15}$) is completed. In this case, the first divide value $DIV_{00}$ is skipped and $DIV_{01}$ is used instead completed where $DIV_{15}$ is used twice and $DIV_{00}$ is skipped.

In Mode 2, the data bit state change is affected immediately by forcing the multi-format all-digital modulator to use the first divide value of the new bit. For example, when "Early Bit Change" occurs in Mode 2 (i.e., the bit changes state during $DIV_{15}$), the Pulse 110 is generated and the new divide value $DIV_{00}$ is loaded immediately even though the counter 120 did not reach the current divide value $DIV_{15}$ stored in the modulus register 124. The net effect is that the new divide value $DIV_{00}$ (generated due to changing the data bit state) is acted upon immediately. So in this case $DIV_{15}$ is skipped and $DIV_{00}$ is repeated twice. Similarly, when "Late Bit Change" occurs in Mode 2, the new divide value $DIV_{00}$ is loaded immediately even though the counter 120 did not reach the current divide value $DIV_{15}$ stored in the modulus register 124.

Mode 1 results in continuous phase while Mode 2 produces phase discontinuity in the modulated signal. A mode control block for controlling the divide cycle based on Mode 1 and Mode 2 may be located in the control unit 104A.

Figure 12:
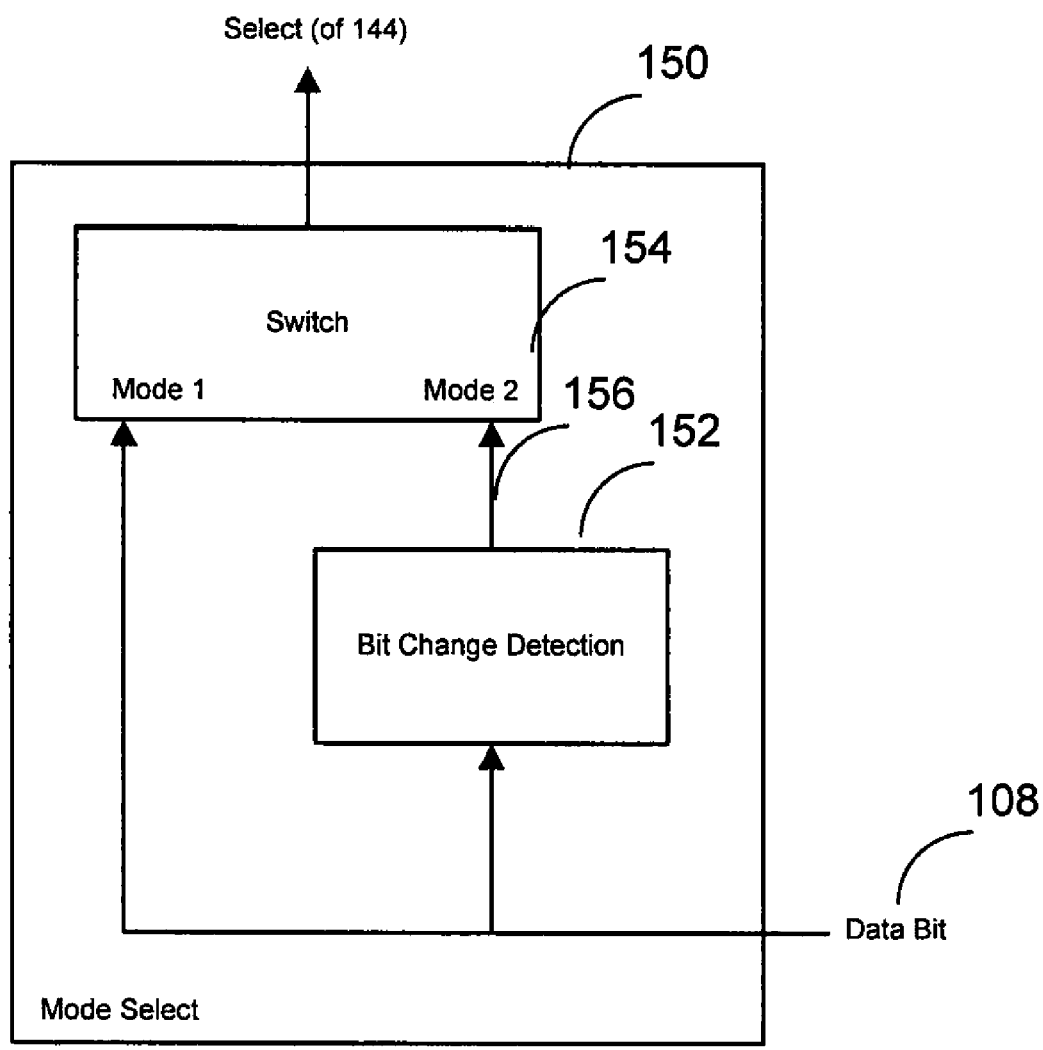
FIG. 12 is a block diagram illustrating an example of a mode control block employed in the multi-format all-digital modulator of FIG. 9.
Figure 13:
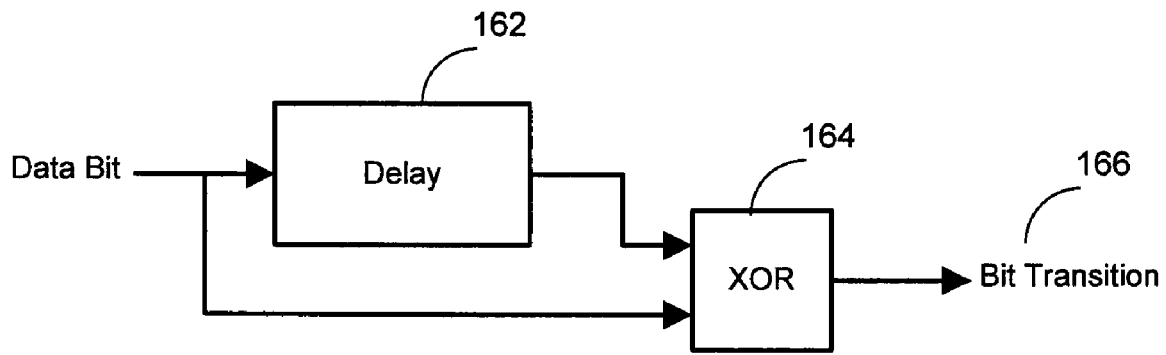
FIG. 13 is a block diagram illustrating an example of a bit change detector in the mode control block of FIG. 12.

FIG. 12 illustrates an example of a mode control block for Mode 1 and Mode 2 operations. The mode control block 150 of FIG. 12 corresponds to the mode control block 106 of FIG. 8. The mode control block 150 includes a bit change detector 152 and a switch 154. The bit change detector 152 detects the change in the data bit line 108. The switch 154 includes a first input for Mode 1 and a second input for Mode 2. The first input of the switch 154 is connected to the data bit line 108. The second input of the switch 154 is connected to the output 156 of the bit change detector 152. FIG. 13 illustrates an example of the bit change detector 152 of FIG. 12. The bit change detector 152 of FIG. 13 includes a delay 162 and an XOR block 164. The XOR block 164 outputs a bit transition 166 that is supplied to the Mode 2 input in the switch 154 of FIG. 12.

Referring to FIGS. 9, 12 and 13, if Mode 1 is used, the mode control block 150 bypasses the bit change detection, and the data bit 108 directly controls the select function of MUX(2:1) 144. If Mode 2 is used, the mode control block 150 detects bit changes and the bit change is used to as the select function for MUX(2:1) 144.

Figure 14:
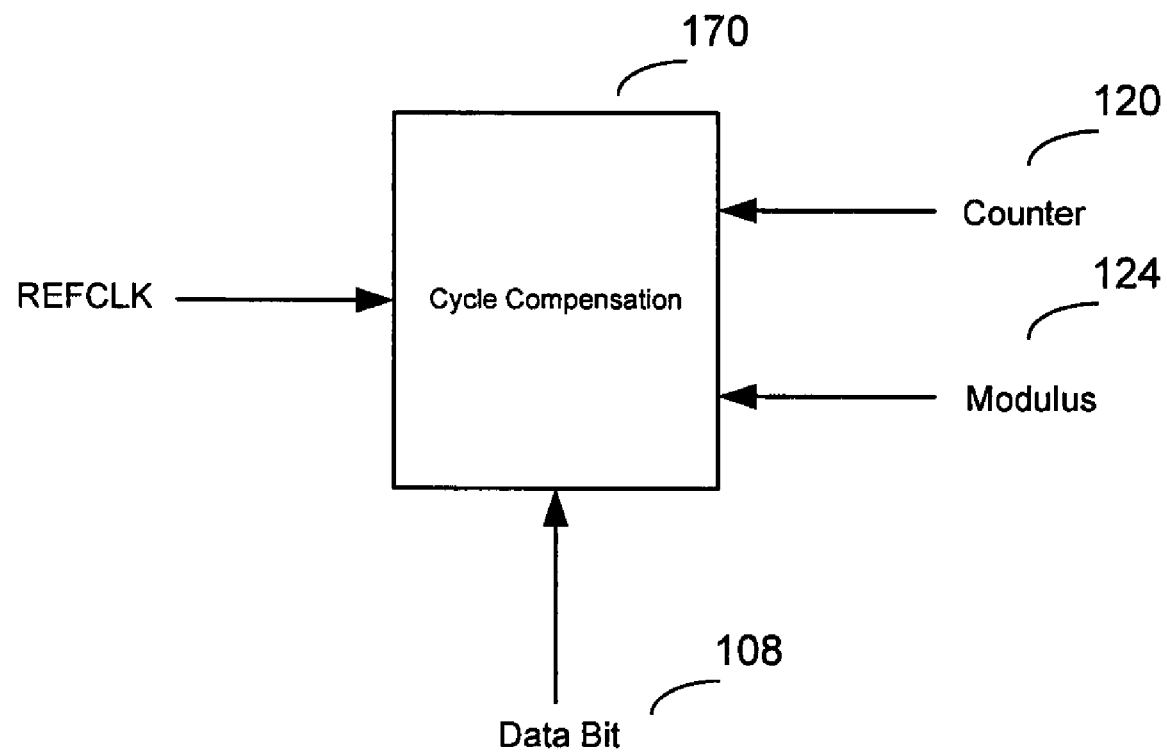
FIG. 14 is a block diagram illustrating a cycle compensation block in accordance with an embodiment of the present invention.

In a further embodiment, the multi-format all-digital modulator 100A of FIG. 9 includes a cycle compensation block 170 as shown in FIG. 14. The cycle compensation block 170 uses the counter value from the counter 120, modulus register value from the modulus register 124, REFCLK and the current data bit state to compute the number of REFCLK cycles that need to be added or subtracted to compensate for the Early and Late Change effect. The compensation by the cycle compensation block 170 avoids shortening or lengthening the modulated bit, as can be seen in FIG. 11 due to the Early and Late Bit Changes in Mode 1 and Mode 2. The compensation block 170 calculates the number of compensation cycles that need to be added or subtracted from the counter value. The compensation block 170 adjusts the current counter 120 value by the calculated number of compensation cycles. The compensation block 170 may be part of the divider unit 102A or the control unit 104A of FIG. 9, or located outside the divider unit 102A and the control unit 104A.

It is well understood by one of ordinary skill in the art that simplification of the above implementation for binary FSK modulation is possible. For example, if the ZeroToOne and OneToZero registers 130 and 132 of FIG. 9 are set to divide sequences that are a mirror of each others, a single register is provided (i.e., one divide sequence), which can be used to transition back and forth between the bits "0" and "1". Another simplification is that these registers may be set to the difference between every two adjacent divide values. Then, at each Pulse, this difference is added or subtracted from the value in the modulus register 124. The implementation allows maximum flexibility when setting the transition divide sequences.

Generating MSK using the multi-format all-digital modulator is described in detail. In MSK modulation, the frequency separation between the frequencies that represent bits "0" and "1" is set to half the data rate as follows:

$$\Delta f = abs(f_1 - f_0) = R/2 \quad (2)$$

where R is the data rate, abs( ) is the absolute value function, $f_0$ is the frequency that represents bit "0", and $f_1$ is the frequency that represents bit "1".

This relationship gives the minimum frequency separation between the two frequencies that guarantees continuous phase, and hence the minimum bandwidth that also guarantees orthogonal waveforms for bits "0" and "1" for optimal performance. When $f_0$ and $f_1$ are described as follows:

$$f_0 = REFCLK/(2 \times M_0) \quad (3a)$$

$$f_1 = REFCLK/(2 \times M_1) \quad (3b)$$

The relationship between REFCLK, R, $M_0$ and $M_1$ can be written as:

$$(R/REFCLK) = abs(M_1 - M_0)/(M_1 \times M_0) \quad (4)$$

Given R and REFCLK, $M_1$ and $M_0$ can be calculated to satisfy Equation (4), and hence produce MSK modulation. Furthermore, once $M_1$ and $M_0$ are known, the divide values in between $M_1$ and $M_0$ can be found and will result in continuous phase at the intermediate frequencies by virtue of Mode 1. Calculation of $M_0$ and $M_1$ is done offline and values are stored in the configuration registers in the control unit 104 of FIG. 8.

Generating M-ary FSK using the multi-format all-digital modulator is described in detail. For 4-FSK, two data bits are grouped to form a symbol. This results in 4 possible symbols for 4-FSK, $S_1 = 00$, $S_2 = 01$, $S_3 = 10$, and $S_4 = 11$. Accordingly, the 4-FSK modulated signal has $f_{00}$, $f_{01}$, $f_{10}$, and $f_{11}$ frequencies representing each symbol respectively. The divide sequence then spans the symbol period in M-ary FSK modulation rather than the bit period as in the binary FSK modulation. In 4-FSK, the divide sequence spans two bit durations. The symbol period is then divided into sub-periods each representing a divide value. In 4-FSK modulation, and having 4 symbols, two divide sequences are provided per every two symbols permutations. That is a total of 12 divide sequences.

Figure 15:
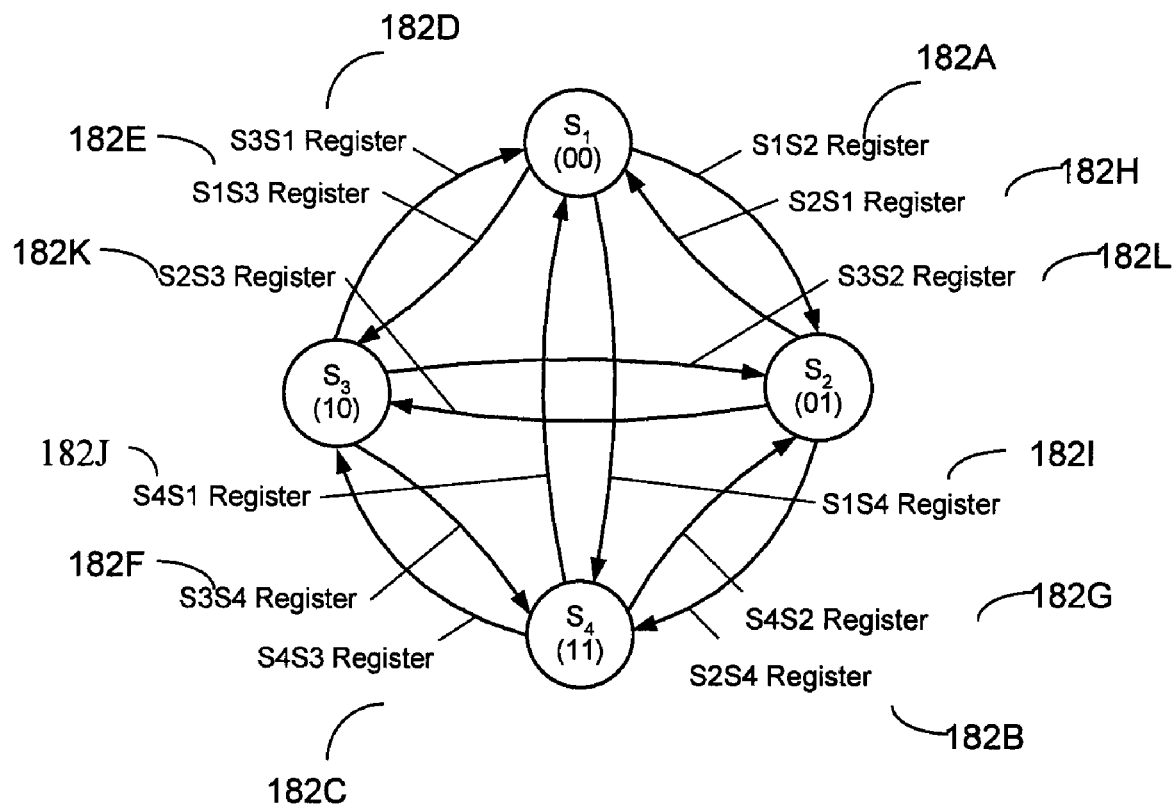
FIG. 15 is a flow diagram illustrating an example of a state transition for generating 4-FSK modulated signal in accordance with an embodiment of the present invention.

FIG. 15 is a flow diagram illustrating an example of a state transition for generating 4-FSK modulated signal in accordance with an embodiment of the present invention. In FIG. 15, each sequence represents the transition from one symbol to the other. In FIG. 15, Si (i=1, 2, 3, 4) represents a state where $S_1$ corresponds to symbol $S_{00}$; $S_2$ corresponds to symbol $S_{01}$; $S_3$ corresponds to symbol $S_{10}$; $S_4$ corresponds to symbol $S_{11}$.

For 4-FSK modulation, the multi-format all-digital modulator includes S1S2 resister 182A, S2S4 resister 182B, S4S3 resister 182C, S3S1 resister 182D, S1S3 resister 182E, S3S4 resister 182F, S4S2 resister 182G, S2S1 resister 182H, S1S4 resister 182I, S4S1 resister 182J, S2S3 resister 182K, and S3S2 resister 182L. These registers 182A-182L may be in the control unit (e.g., 104 of FIG. 8, 104A of FIG. 9). Each of the registers 182A-182L stores a divide sequence. The modulus register 124 of FIG. 9 is loaded from one register that holds one of these divide sequences.

Figure 16:
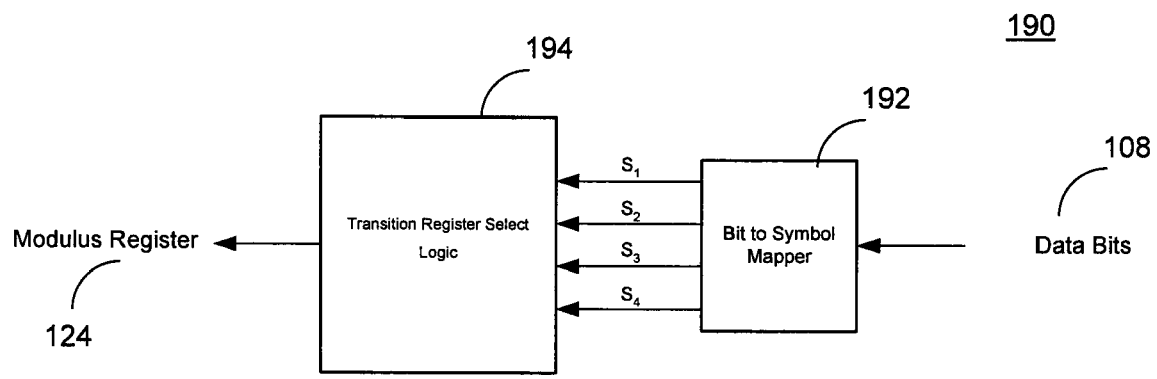
FIG. 16 is a block diagram illustrating an example of a 4-FSK modulation control block for 4-FSK modulation in accordance with an embodiment of the present invention.

FIG. 16 is a block diagram illustrating an example of a 4-FSK modulation control block for 4-FSK modulation in accordance with an embodiment of the present invention. The 4-FSK modulation control block 190 of FIG. 16 provides a divide value. The 4-FSK modulation control block 190 may be in the control unit 104 of FIG. 8 or 104A of FIG. 9. The divide value is provided, for example, to the modulus register 124 of FIG. 9.

The 4-FSK modulation control block 190 includes a bit to symbol mapper 192 and a transition register select logic 194. The bit to symbol mapper 192 maps every two incoming data bits 108 into one of the four symbols, $S_1$, $S_2$, $S_3$ or $S_4$. Based on the selected symbol, one of the registers (182A-182L of FIG. 15), each for holding the divide sequence, is selected and used to load the modulus register 124 of FIG. 9.

It is well understood by one of ordinary skill in the art that it is possible to simplify the above implementation for 4-FSK modulation. For example, if the S1S2 and S2S1 registers 182A and 182H of FIG. 15 are chosen to be a mirrored version of each others, one register per every two symbols permutations is provided. In this case, six registers are used. However, the above implementation allows maximum flexibility when setting the transition divide sequences.

It is well understood by one of ordinary skill in the art that the multi-format all-digital modulator for 4-FSK modulation is applicable for higher order M-ary FSK modulation.

Figure 17:
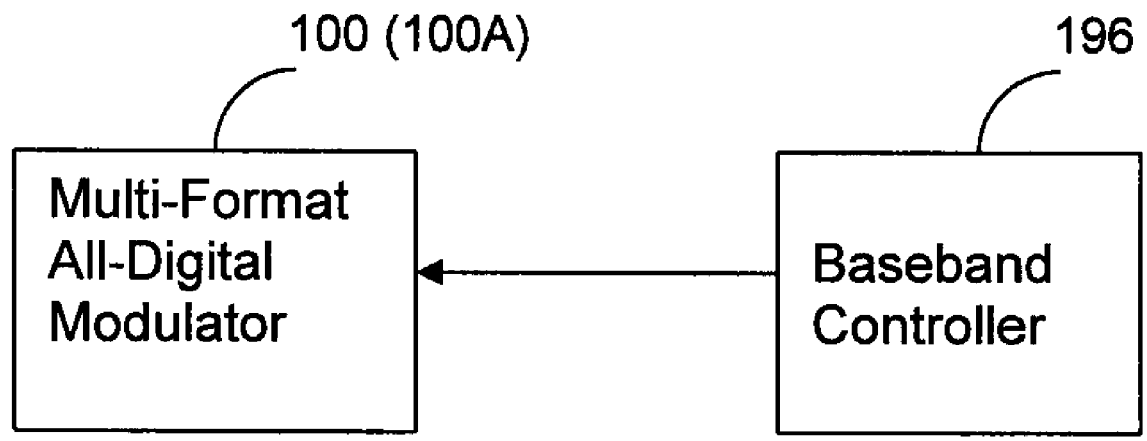
FIG. 17 is a block diagram illustrating a combination of a baseband controller and the multi-format all-digital modulator in accordance with an embodiment of the present invention.

From the above description, the multi-format all-digital modulator is flexible and versatile and provides capabilities to produce a desired modulated signal and is easily scalable. The actual divide values (to produce the IF modulated signal, or the divide sequence (to shape the spectrum) can be defined at a later stage in the design process or even after the hardware is available. No prior knowledge of the required divide sequences that will produce these modulation formats is necessary. All divide sequences can be predetermined, or programmed by the user. Further, it is possible to load the divide sequences on the fly. As shown in FIG. 17, a baseband controller 196 for controlling the modulator (100 of FIG. 8, 100A of FIG. 9) may download new divide values and divide sequences to the modulator 100 of FIG. 8 (100A of FIG. 9) to configure it for the desired format and hence reconfigure the modulator for other modulation formats.

Interfacing to IQ transmitter architecture is described in detail. The multi-format all-digital modulator (e.g., 100 of FIG. 8 or 100A of FIG. 9) is configurable to generate a modulated signal at an IF frequency. As an example, if REFCLK is 50 MHz, the divide value for bit "0" $M_0$ is set to 50, while the divide value for bit "1" $M_1$ is set to 40. Then the frequency that represents bit "0" is 1 MHz, while the frequency of 1.25 MHz represents bit "1". Thus the output is an FSK modulated centered at 1.125 MHz. To transmit this IF FSK modulated signal, an IQ front-end transmitter is used to provide image rejection while up-converting the IF FSK modulated signal to the transmission frequency.

Rather than running the multi-format all-digital modulator 100 at twice the clock frequency and then dividing the output by two to produce the I and Q signals, the divider unit 102A of FIG. 9 is modified to generate the I and Q signals while running the multi-format all-digital modulator at the original clock frequency.

Figure 18:
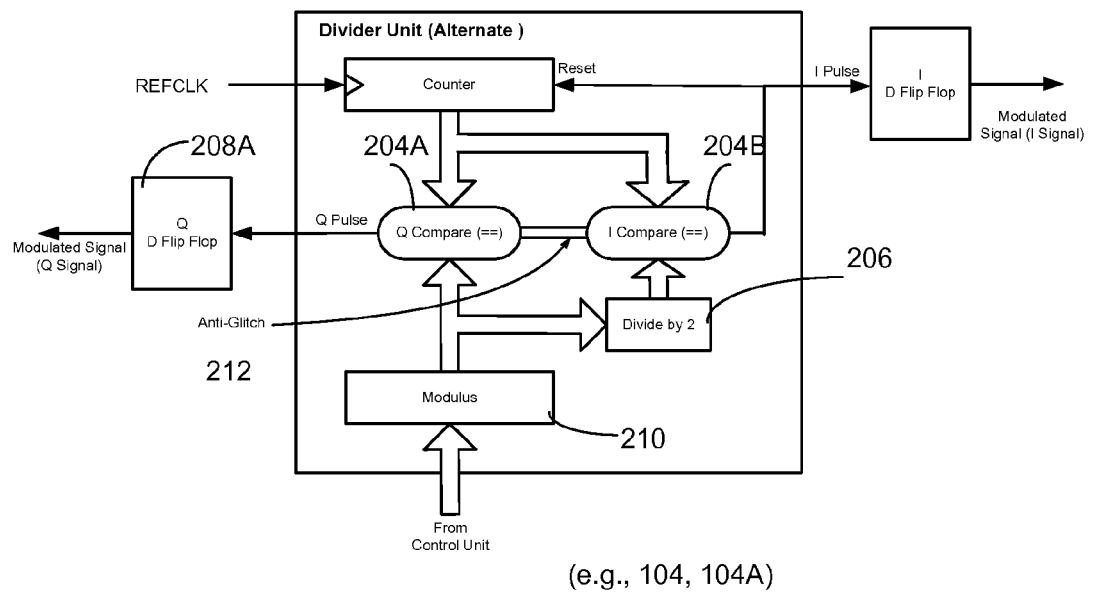
FIG. 18 is a block diagram illustrating an example of a divider unit for generating I and Q pulses in accordance with an embodiment of the present invention.

FIG. 18 is a diagram illustrating an example of a divider unit for generating I and Q pulses in accordance with an embodiment of the present invention. The divider unit 200 of FIG. 18 is used in the multi-format all-digital modulator (e.g., 100 of FIG. 8 or 100A of FIG. 9). D flip flops 206A and 206B are used for Q and I, respectively, instead of the DFF 106 of FIG. 9. Two compare operations take place in this embodiment, Q compare and I compare (Q compare logic unit 204A and I compare logic unit 204B). The I compare operation is done on a divide by two value 206 of a modulus register 210 which holds the current divide value. The Q compare operation 204A is done on the modulus value itself. The I compare operation 204B produces the I Pulse which is used in the DFF 208B to produce the I signal, while the Q compare operation 204A produces the Q Pulse that is used in the DFF 208A to produce the Q signal. A counter 202 receives the reference clock REFCLK and provides the counter value to the Q compare block 204A and the I compare block 204B.

An anti-glitch circuit 212 (shown as a double line between the two compare blocks) ensures that the I and Q Pulse waveforms are valid for any divide values. The anti-glitch circuit 212 is an enable and disable lines between the I and Q comparators 204A and 204B. When the I compare block 204B produces and outputs the result (the comparison operation yields TRUE logic value), it disables the Q compare block 204A so that the output on the Q is maintained at its current state. When the Q compare block 204A produces an output, it disables the I compare block 204B so that the output on the I is maintained at its current state.

The counter 202 may be similar or the same as the counter 120 of FIG. 9. The divider unit 200 may use the counter 120 of FIG. 9. The modulus register 210 may be similar or the same as the modulus register 124 of FIG. 9. The divider unit 200 may use the modulus register 124.

FIGS. 19A and 19B are diagrams illustrating examples of I and Q signal generation by using the divider unit 200 of FIG. 18. In FIG. 19A, the divide value is 8 for bit "0". In FIG. 19B, the divide value is 6 for bit "1". In FIG. 19A, the I and Q signals generated when the bit is "0" (modulus value is 8). In FIG. 19B, the I and Q signals generated when the bit is "1" (modulus value is 6). Since the I compare operation is performed on a divided by 2 value of the modulus (e.g., 210 of FIG. 18), the I compare operation always generates a Pulse that leads the pulse generated by the Q compare operation by 90°. The I and Q signals are then fed into an IQ front-end architecture (as the one shown in FIG. 4) to up-convert the IF modulated FSK signal.

In FIGS. 18 and 19A-19B, the quadrature signal is generated based on a compare logic operation of the reference clock REFCLK count to a main divide value (in the modulus register 208), and the in-phase signal is generated based on a compare logic operation of the reference clock REFCLK count to a divided by two value 206 of the main value. However, in example, the in-phase signal may be generated based on a compare logic operation of the reference clock REFCLK count to a main divide value (in the modulus register 208), and the quadrature signal may be generated based on a compare logic operation of the reference clock REFCLK count to a divided by two value 206 of the main value According to the embodiments of the present invention, the multi-format all-digital modulator provides a single designed modulator that can be configured for multi modulation schemes. It can be used in various applications that require different modulation schemes with little or no modifications. This simply translates to re-use cost benefit.

The multi-format all-digital modulator are digital basis and are fully programmable, resulting in significantly reducing risk. Such modulator can be fully verified before chip fabrication. Actual divide values and hence FSK modulated signal characteristics can be fully configured, changed, and fine tuned even after the chip is fabricated.

Since the multi-format all-digital modulator is digital, it is possible to simply re-use with other technologies for other projects, i.e. scales and integrates well. It significantly reduces the risk and simplifies the design of the transmitter RF/analog front-end. For example, the PLL synthesizer will have no loop constraints and can be designed relatively easily.

One or more currently preferred embodiments have been described by way of example. It will be apparent to persons skilled in the art that a number of variations and modifications can be made without departing from the scope of the invention as defined in the claims.

What is claimed is:
1. A digital modulator comprising:
   a dividing mechanism for dividing a reference clock by a divide value to produce a modulated signal associated with at least one input data, the dividing mechanism comprising:
      at least one counter for counting the reference clock and for providing a counter value;
      at least one modulus register for providing the divide value, and at least one compare logic unit for comparing the counter value from the at least one counter with the divide value from the at least one modulus register to generate a pulse associated with the modulated signal based on the result of the comparison; and a control unit for providing at least one divide sequence to the dividing mechanism, the at least one divide sequence including a sequence of one or more divide values, the divide value of the divide sequence being configurable and selectively provided to the dividing mechanism based on the at least one input data.

2. A modulator according to claim 1, wherein the at least one divide sequence is configurable at any time of operation.

3. A modulator according to claim 1, further comprising:
a control mechanism for selectively providing the divide value to the dividing mechanism and controlling the timing of providing the divide value to the dividing mechanism.

4. A modulator according to claim 1, further comprising:
a control block for allowing the dividing mechanism to complete the current divide operation when the data bit changes during the current divide operation or forcing the dividing mechanism to interrupt the current divide operation when the data bit changes during the current divide operation.

5. A modulator according to claim 1, wherein the at least one divide sequence is stored outside of the modulator.

6. A modulator according to claim 1, wherein the at least one divide sequence is predetermined or programmed by a user.

7. A modulator according to claim 1, wherein the control unit is operatable for controlling the divide operation of the dividing mechanism based on the at least one divide sequence having a first divide sequence and a second divide sequence, the control unit including:
a first storage for the first divide sequence;
a second storage for the second divide sequence;
a first selector for selecting the divide value of the first divide sequence;
a second selector for selecting the divide value of the second divide sequence; and
a third selector for selectively loading the divide value selected by the first selector or the second selector into the at least one modulus register.

8. A modulator according to claim 1, further comprising:
a generator for generating the pulse associated with the modulated signal based on the output from the dividing mechanism; and
a toggle mechanism for converting the generated pulse to the modulated signal.

9. A modulator according to claim 1, further comprising:
a cycle compensation block for calculating the number of divide cycles that need to be added or subtracted from the counter value.

10. A modulator according to claim 1, wherein the dividing mechanism further comprises:
a divider for dividing the divide value from the at least one modulus register; and
the at least one compare logic unit comprising:
a first compare logic unit for comparing the counter value from the at least one counter with the divide value from the at least one modulus register; and
a second compare logic unit for comparing the counter value from the at least one counter with the divided divide value from the divider, the first compare logic unit or the second compare logic unit outputting a pulse associated with an in-phase version of the modulated signal and the other outputting a pulse associated with a quadrature version of the modulated signal.

11. A method of modulating digital data, comprising:
configuring at least one divide sequence including a sequence of one or more divide values;
selecting a divide value from the at least one divide sequence based on at least one input data;
dividing a reference clock by the selected divide value to produce a modulated signal associated with the at least one input data, the step of dividing comprising:
at a counter, counting the reference clock to provide a counter value;
at a modulus register, providing the divide value; and
at a compare logic unit, comparing the counter value from the counter with the divide value from the modulus register to generate a pulse associated with the modulated signal based on the result of the comparison; and
generating the pulse associated with the modulated signal.

12. A method according to claim 11, wherein the step of configuring comprises:
configuring the at least one divide sequence at any time of operation.

13. A method according to claim 11, further comprising at least one of the steps:
completing the current divide operation when the data bit changes during the current divide operation; and
interrupting the current divide operation when the data bit changes during the current divide operation.

14. A method according to claim 11, the step of dividing further comprising:
controlling the step of dividing based on the at least one divide sequence having a first divide sequence and a second divide sequence, the step of controlling including:
selecting the divide value of the first divide sequence;
selecting the divide value of the second divide sequence; and
selectively loading into the modulus register the selected divide value of the first divide sequence or the selected divide value of the second divide sequence.

15. A method according to claim 11, further comprising:
converting the generated pulse to the modulated signal.

16. A method according to in claim 11, further comprising:
calculating the number of divide cycles that need to be added or subtracted from the counter value to adjust the pulse width.

17. A system for modulation-based commutations link, comprising:
a modulation unit having a dividing mechanism for dividing a reference clock by a divide value to produce a modulated signal associated with at least one input data, the dividing mechanism comprising:
at least one counter for counting the reference clock and for providing a counter value;
at least one modulus register for providing the divide value, and
at least one compare logic unit for comparing the counter value from the at least one counter with the divide value from the at least one modulus register to generate a pulse associated with the modulated signal based on the result of the comparison; and
a configuration register for one or more configurable divide sequences, each divide sequence including a sequence of one or more divide values, the divide value of the divide sequence being selectively provided to the dividing mechanism based on the at least one input data.

18. A method of modulating digital data, comprising:
configuring at least one divide sequence including a sequence of one or more divide values;
selecting a divide value from the at least one divide sequence based on at least one input data;

dividing a reference clock by the selected divide value to produce a modulated signal associated with the at least one input data, the step of dividing comprising:
  at a counter, counting the reference clock to provide a counter value;
  at a modulus register, providing the divide value;
  at a divider, dividing the divide value from the modulus register;
  at a first compare logic unit, comparing the counter value from the counter with the divide value from the modulus register;
  at a second compare logic unit, comparing the counter value from the counter with the divided divide value from the divider, the first compare logic unit or the second compare logic unit outputting a pulse associated with an in-phase version of the modulated signal and the other outputting a pulse associated with a quadrature version of the modulated signal; and
generating the pulse associated with the modulated signal.

* * * * *